(12) United States Patent
Chen et al.

(10) Patent No.: US 11,732,058 B2
(45) Date of Patent: Aug. 22, 2023

(54) THERMOPLASTIC STARCH AND STARCH-BASED BIODEGRADABLE FILM

(71) Applicant: Nanjing Wurui Biodegradable New Material Research Institute Co., LTD., Nanjing (CN)

(72) Inventors: Changping Chen, Nanjing (CN); Yucai Shen, Nanjing (CN)

(73) Assignee: Nanjing Wurui Biodegradable New Material Research Institute Co., LTD., Nanjing (CN)

( * ) Notice: Subject to any disclaimer, the term of this patent is extended or adjusted under 35 U.S.C. 154(b) by 489 days.

(21) Appl. No.: 16/938,248

(22) Filed: Jul. 24, 2020

(65) Prior Publication Data
US 2022/0002445 A1 Jan. 6, 2022

(30) Foreign Application Priority Data

Jul. 1, 2020 (CN) .......................... 202010618285.0

(51) Int. Cl.
| | | |
|---|---|---|
| C08B 31/18 | (2006.01) |
| C08K 3/013 | (2018.01) |
| C08L 47/00 | (2006.01) |
| B29B 7/00 | (2006.01) |
| B29B 7/20 | (2006.01) |
| C08K 5/00 | (2006.01) |

(52) U.S. Cl.
CPC .............. *C08B 31/18* (2013.01); *B29B 7/005* (2013.01); *B29B 7/20* (2013.01); *C08K 3/013* (2018.01); *C08L 47/00* (2013.01); *B29K 2003/00* (2013.01); *C08K 5/0016* (2013.01); *C08L 2201/06* (2013.01); *C08L 2310/00* (2013.01)

(58) Field of Classification Search
None
See application file for complete search history.

(56) References Cited

U.S. PATENT DOCUMENTS

| | | | | |
|---|---|---|---|---|
| 8,232,348 B2 * | 7/2012 | Changping | .............. | C08J 3/226 527/311 |
| 2005/0154114 A1 * | 7/2005 | Hale | ....................... | C08L 67/04 524/436 |
| 2013/0202223 A1 * | 8/2013 | Kang | ..................... | B65D 33/00 525/418 |
| 2014/0017752 A1 * | 1/2014 | Sinkel | ....................... | B09B 3/00 435/167 |
| 2016/0152824 A1 * | 6/2016 | Coupin | .................... | C08L 47/00 264/177.1 |
| 2016/0316759 A1 * | 11/2016 | Bougoure | .............. | A01N 25/34 |
| 2018/0327587 A1 * | 11/2018 | Marcille | ................ | C08K 5/103 |

FOREIGN PATENT DOCUMENTS

| | | | | |
|---|---|---|---|---|
| CN | 104119647 A | 10/2014 | | |
| CN | 104672508 A | 6/2015 | | |
| CN | 108948680 A | 12/2018 | | |
| WO | WO-9940134 A1 * | 8/1999 | ................ | C08F 2/18 |

OTHER PUBLICATIONS

Jiufang Duan, "Natural Polymer Material", Huazhong University of Science and Technology Press, Sep. 30, 2016, p. 102-103.

* cited by examiner

*Primary Examiner* — Stefanie J Cohen

(74) *Attorney, Agent, or Firm* — Bayramoglu Law Offices, LLC

(57) ABSTRACT

A multi-stage modified thermoplastic starch (TPS) masterbatch is obtained by four-stage modification treatment as follows: (i) 100 parts of starch with a moisture content of 15% to 30% are added to a high-speed mixer and stirred under room temperature; (ii) Heated to 50° C. to 70° C., polybutadiene (PB), plasticizer and a chemical modifier are added. The mixture is then stirred a second time; (iii) Heated to 75° C. to 95° C., tackifier, lubricant, filler and chain extender are added. The mixture is again stirred a third time. (iv) A biodegradable resin is added at this temperature, and the resulting mixture is stirred a fourth time. After the stirring is completed, the resulting mixture is incubated at this temperature for a predetermined time, and then added to a twin-screw extruder for melt extrusion. The present invention also discloses a preparation method and use.

20 Claims, No Drawings

THERMOPLASTIC STARCH AND STARCH-BASED BIODEGRADABLE FILM

CROSS REFERENCE TO THE RELATED APPLICATIONS

This application is based upon and claims priority to Chinese Patent Application No. 202010618285.0, filed on Jul. 1, 2020, the entire contents of which are incorporated herein by reference.

TECHNICAL FIELD

The present invention relates to biodegradable plastics, and more particularly, to a multi-stage modified thermoplastic starch (TPS) masterbatch, a preparation method thereof, use thereof in the preparation of a starch-based biodegradable film and the prepared starch-based biodegradable film.

BACKGROUND

Conventional plastic products, such as polyethylene (PE), polypropylene (PP) and polystyrene (PS), are typically stable in nature and last due to their extremely-stable properties and poor degradability. They are called white pollution because these plastics cause severe environmental pollution. In order to alleviate the environmental pressure, biodegradable plastics have become highly desirable and the subjects of academic and industry research.

Biodegradable plastics refer to polymer materials that can decompose into carbon dioxide and water within a relatively-short period under normal environmental conditions. Currently, common biodegradable plastics include: PHA, PLA, PBAT, PHB, PCL, PHBV, PBS, PBSA and natural products with a polysaccharide structure, such as thermoplastic starch (TPS) and cellulose acetate. TPS refers to starch that is modified by esterification, grafting and other processes. With low cost and excellent degradability, TPS is the preferred material for biodegradable plastics.

However, the common biodegradable films made of TPS have disadvantages, such as poor mechanical properties, rough film surface and poor transparency. Moreover, because of its poor compatibility with other biodegradable materials, only limited amounts of starch can typically be added to other biodegradable materials. Higher starch content has a significant influence, however, on the mechanical properties and the efficiency with which film may be blow molded. The present invention increases the starch content in a biodegradable film, and the film produced according to the invention has improved mechanical properties, film surface finish and transparency.

SUMMARY

The present invention provides a multi-stage modified TPS masterbatch, which effectively improves the compatibility of starch with other biodegradable materials thus increasing the starch content in a biodegradable film, making the film have excellent mechanical properties, film surface finish and transparency.

The objective of the present invention is achieved through the following technical solutions. A multi-stage modified thermoplastic starch (TPS) masterbatch is prepared by the following raw materials, in parts by weight:

starch with a moisture content of 15% to 30%: 100 parts
plasticizer: 10 to 30 parts
polybutadiene (PB): 0.1 to 3 parts
chemical modifier: 0.5 to 3 parts
tackifier: 1 to 10 parts
lubricant: 1 to 5 parts
filler: 1 to 10 parts
chain extender: 0.5 to 2 parts
biodegradable resin for masterbatch: 5 to 25 parts;

where, the starch is subjected to four-stage modification treatment. The four-stage modification treatment is specifically as follows: 100 parts of starch with a moisture content of 15% to 30% are added to a high-speed mixer and stirred at a high speed under room temperature for the first time; heated the starch to 50° C. to 70° C., and PB, plasticizer and chemical modifier are added, and a resulting mixture is stirred at a high speed for the second time; heated the mixture to 75° C. to 95° C., and tackifier, lubricant, filler and chain extender are added, and a resulting mixture is stirred at a high speed for the third time; a biodegradable resin for masterbatch is added at this temperature, and a resulting mixture is stirred at a high speed for the fourth time; and after the stirring is stopped, a resulting mixture is incubated at this temperature for a period of time, and then added to a twin-screw extruder for melt extrusion.

Preferably, the plasticizer is one or more of glycerol, sorbitol and epoxy soybean oil (ESBO). The PB is one or more of hydroxyl-terminated polybutadiene (HTPB), epoxidized polybutadiene (EPB) and 1,2-polybutadiene homopolymer. The chemical modifier is one or more of maleic anhydride, citric acid and glycidyl methacrylate (GMA). The tackifier is one or two of polyvinyl acetate (PVAc) and ethylene-ethyl acrylate copolymer (EEA). The lubricant is one or more of calcium stearate, oleamide, and erucamide. The filler is one or more of talc powder, calcium carbonate, barium sulfate, montmorillonite and mica powder. And the chain extender is a mixture of one or more of isocyanate chain extender, epoxy chain extender and oxazoline chain extender.

Preferably, the TPS masterbatch further includes 1 to 10 parts of modified starch, and the modified starch is one or two of oxidized starch and hydroxypropyl starch.

Preferably, the PB is a mixture of HTPB and EPB, and the HTPB and EPB are mixed at a weight ratio of 3:1 to 1:1.

Preferably, the tackifier is a copolymer of PVAc and EEA, and the PVAc and EEA are mixed at a weight ratio of 3:1 to 1:1.

Preferably, the biodegradable resin for masterbatch is one or two of PBAT and PBSA.

Preferably, in the PBSA, succinic acid has a copolymerization percent of 30% to 45%, adipic acid has a copolymerization percent of 15% to 30%, and butylene glycol has a copolymerization percent of 40% to 55%.

Preferably, the first high-speed stirring is conducted at 600 rpm to 1,000 rpm for 1 min to 5 min. The second high-speed stirring is conducted at 800 rpm to 1,200 rpm for 5 min to 20 min. The third high-speed stirring is conducted at 800 rpm to 1,200 rpm for 5 min to 15 min. The fourth high-speed stirring is conducted at 800 rpm to 1,200 rpm for 1 min to 5 min and the incubation lasts for 2 h to12 h.

A method for preparing the above TPS masterbatch includes:

(1) subjecting 100 parts of starch with a moisture content of 15% to 30% to a first high-speed stirring at room temperature;

(2) heating the starch to 50° C. to 70° C., then adding plasticizer, PB and chemical modifier, and subjecting a resulting mixture to a second high-speed stirring;

(3) heating a resulting mixture to 75° C. to 95° C., then adding tackifier, lubricant, filler and chain extender, and subjecting a resulting mixture to a third high-speed stirring;

(4) adding a biodegradable resin for masterbatch, and subjecting a resulting mixture to a fourth high-speed stirring;

(5) stopping stirring, and conducting incubation; and (6) adding the incubated starch mixture to a twin-screw extruder to obtain a TPS masterbatch through extruding, air cooling and granulating.

Preferably, the first high-speed stirring is conducted at 600 rpm to 1,000 rpm for 1 min to 5 min. The second high-speed stirring is conducted at 800 rpm to 1,200 rpm for 5 min to 20 min. The third high-speed stirring is conducted at 800 rpm to 1,200 rpm for 5 min to 15 min. The fourth high-speed stirring is conducted at 800 rpm to 1,200 rpm for 1 min to 5 min and the incubation lasts for 2 h to12 h.

Preferably, in step (6), a twin-screw extruder is adopted for melt extrusion. The melt extrusion is conducted with an aspect ratio of 44:1 to 60:1, a temperature of 110° C. to 160° C., and a screw speed of 150 rpm to 600 rpm. The twin-screw extruder has a vacuum exhaust function module on the end thereof.

Preferably, in step (1), 1 to 10 parts of modified starch are also added, and the modified starch is one or two of oxidized starch and hydroxypropyl starch.

The use of the above TPS masterbatch in the preparation of a starch-based biodegradable film will now be described.

A starch-based biodegradable film is prepared by the following raw materials, in parts by weight:

the TPS masterbatch 40 to 80 parts and
biodegradable resin: 40 to 55 parts.

Preferably, the biodegradable resin is a mixture of one or more of PLA, PBSA, PBAT and PPC.

Preferably, the TPS masterbatch is blended with the biodegradable resin, and blow molding is conducted to produce a starch-based biodegradable film.

Preferably, the blown film process is conducted at 145° C. to 175° C., with a blow-up ratio (BUR) of 3:1 to 5.5:1.

The present invention has the following beneficial effects: the TPS masterbatch is subjected to four-stage modification treatment with a high-speed mixer. At stage 1, an original starch is mixed with a modified starch at room temperature. The moisture content of the original starch is controlled to a certain degree to facilitate the better plasticization and the plasticizer reduction during the high-speed mixing of starches; and the addition of the modified starch is conducive to the reduction of gelatinization temperature, and can improve the gelatinization stability and the compatibility of starch with other biodegradable materials.

At stage 2, the mixture is heated to 50° C. to 70° C., added with a part of additives, and then subjected to a second high-speed stirring. The addition of a plasticizer, such as a mixture of glycerol and sorbitol or glycerol and epoxy soybean oil (ESBO) mixed at a fixed ratio, can result in a more efficient plasticizing effect. Polybutadiene (PB) has poor compatibility with matrices, such as starch and PBSA. The PB micro/nano-particles formed after a trace amount of PB mixed in the plasticizer is added, together with the modified starch and the modified PBSA added later, however, can form a topological network structure through coupling, partial hydrogen bonding and chemical interaction. On the one hand, the entanglement of polymer chains of matrices are reduced. The final material, when being stretched, will first deform due to the soft micro/nano-particles, and then will produce the phenomena of micropores and necking in tension as the stretching continues due to the existence of this topological structure around particles. These micropores are relatively resistant to stretching and absorb more energy because of this topological structure.

On the other hand, owing to the formation of a regular topological structure around particles, the orientation of a molecular chain in the stretching direction during the stretching process is more conducive to inducing crystallization. The final material can thus obtain higher strength and toughness, and appropriate elongation at break. To obtain this topological structure, it is critical to understand that incompatible PB can be dispersed at the micro/nano scale, and also have a suitable interaction with the modified starch, modified PBSA, etc. An interaction that is too strong or weak is not conducive to obtaining this topological structure. The addition of chemical modifiers is to make the TPS have a certain reactivity, produce a certain interaction force with PB, and exhibit an improved compatibility with other degradable materials.

Three chemical modifiers, including maleic anhydride, citric acid and glycidyl methacrylate (GMA) are added to achieve the grafting for starch and the modification for PBSA. The modified starch and PBSA will interact with PB micro/nano-particles to further promote the formation of a topological structure, and the grafting reaction partially takes place during the mixing treatment at stage 4, but mainly takes place during the twin-screw melt extrusion. Other additives are not added at this stage to allow a better, more thorough reaction of the chemical modifiers with starch, and to avoid the reaction of the chemical modifiers with other additives.

At stage 3, the mixture is heated to 75° C. to 95° C., added with the remaining additives (tackifier, lubricant, filler and chain extender), and then subjected to a third high-speed stirring. The addition of a tackifier (a mixture of polyvinyl acetate (PVAc) and ethylene-ethyl acrylate copolymer (EEA) mixed at a weight ratio of 1:1 to 3:1), on the one hand, increases the dispersion stability of the mixture of various powders, because the tackifier has been partially softened. On the other hand, the tackifier also improves the compatibility among different phases during the later melt extrusion, and intensify the strength of melts and the stability of bubbles during the blow molding, which makes the film possess higher transparency and gloss.

The addition of a lubricant (one or more of calcium stearate, oleamide, and erucamide) improves the surface finish of the melt-extruded particles and thus the anti-blocking property and surface finish of the blown film. A filler, one or more of talc powder, calcium carbonate, barium sulfate, montmorillonite and mica powder, improves the strength and anti-blocking property of the film. Some fillers, barium sulfate, for example, also increases the transparency of the film. The addition of a chain extender can increase the compatibility of starch with a biodegradable resin through reactive compatibilization during the later extrusion and film blowing process, and can also improve the stability of biodegradable materials and blown film bubbles.

At stage 4, a biodegradable resin for masterbatch (i.e., one or two of PBAT and PBSA) is added. The previous additives are powders or liquids and are best miscible with each other. The biodegradable resin in the form of particles is finally added alone to allow easy mixing. Moreover, the added biodegradable resin can also partially transesterify with the chemically-modified starch (such as maleic anhydride-modified starch) during the melt extrusion at the next stage, which improves the compatibility of the TPS masterbatch with other biodegradable resins during the blow molding.

After the stirring is completed, the mixture is incubated at the above temperature for a period of time to allow the adequate plasticization and the complete reaction of starches, thereby ensuring that the starch mixture obtained at this stage is stable. With clear objectives for the treatment at all stages, the overall process is efficient, environmentally-friendly, and low in energy consumption. The modified TPS has significantly-improved performance compared to conventional TPS, and also exhibits significantly improved compatibility with other biodegradable materials. This increases the starch content in a biodegradable film, making the biodegradable film have excellent mechanical properties, film surface finish and transparency. The new TPS is much less expensive and the biodegradable film produced therefrom exhibits increased biodegradability as well. After it is used, the biodegradable film of the invention can be treated in home composting.

DETAILED DESCRIPTION OF THE EMBODIMENTS

Epoxy chain extender: The following structural formula may be adopted:

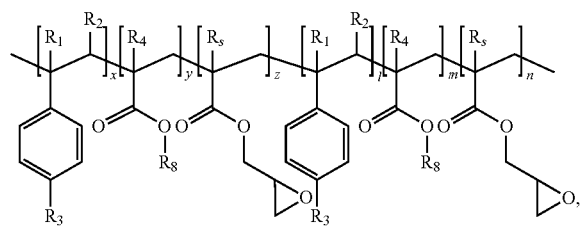

and in an embodiment of the present invention, KL-E4370 of Shanxi Institute of Chemical Industry is adopted.

Oxazoline chain extender: The following structural formula may be adopted:

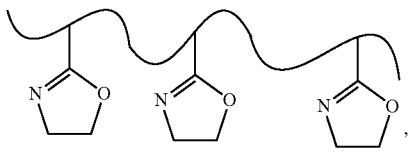

and in an embodiment of the present invention, B1511 of TCI (Shanghai) Development Co., Ltd. is adopted.

Isocyanate chain extender: In an embodiment of the present invention, hexamethylene diisocyanate (HDI) is adopted.

Hydroxyl-terminated polybutadiene (HTPB) has the following structural formula:

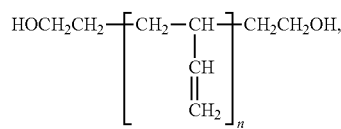

and in an embodiment of the present invention, G-1000 of Nippon Soda is adopted.

Epoxidized polybutadiene (EPB) has the following structural formula:

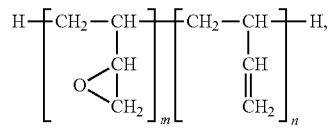

and in an embodiment of the present invention, JP-200 of Nippon Soda is adopted. 1,2-polybutadiene homopolymer has the following structural formula:

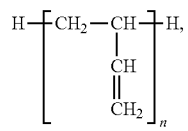

and in an embodiment of the present invention, B-2000 of Nippon Soda is adopted.

Main Experimental Groups: Examples 1 to 8

A method for preparing a TPS masterbatch includes the following steps:

(1) 100 parts of starch were taken and adjusted to have a moisture content of 22%, 3 parts of oxidized starch and 4 parts of hydroxypropyl starch were added, and a resulting mixture was subjected to a first high-speed stirring at room temperature;

(2) a resulting mixture was heated to 50° C. to 70° C., added with a part of additives, and then subjected to a second high-speed stirring;

(3) a resulting mixture was heated to 75° C. to 95° C., added with the remaining additives, and then subjected to a third high-speed stirring;

(4) a biodegradable resin for masterbatch was added, and a resulting mixture was subjected to a fourth high-speed stirring;

(5) the stirring was stopped, and incubation was conducted; and (6) the incubated starch was subjected to melt extrusion to obtain a TPS masterbatch.

The ingredient lists are shown in Table 1, in parts by weight, and the process parameters for each step are shown in Table 2.

Corn starch was adopted here, but other starches, such as cassava starch, rice starch and potato starch, may also be adopted.

TABLE 1

Ingredient lists for Examples 1 to 8

|  | Additives added the first time | Additives added the second time | Biodegradable resin for masterbatch |
| --- | --- | --- | --- |
| Example 1 | glycerol: 13 parts: sorbitol: 2.6 parts: HTPB: 1 part; EPB: 1 part: maleic anhydride: 0.8 | PVAc: 4 parts; EEA: 2 parts; calcium stearate: 3 parts; talc powder: 3 parts; calcium carbonate: 3 parts; isocyanate chain extender: | PBSA (35% of succinic acid, 18% of adipic acid, 47% of butylene glycol): 16 parts |

TABLE 1-continued

Ingredient lists for Examples 1 to 8

| | Additives added the first time | Additives added the second time | Biodegradable resin for masterbatch |
|---|---|---|---|
| | part: citric acid: 0.5 part; GMA: 0.8 part | 1.2 parts | |
| Example 2 | glycerol: 10 parts; HTPB: 1 part; EPB: 0.5 part; maleic anhydride: 0.5 part | EEA: 6 parts; calcium stearate: 1 part; talc powder: 1 part; isocyanate chain extender: 0.5 part | PBSA (30% of succinic acid, 15% of adipic acid, 55% of butylene glycol): 16 parts |
| Example 3 | glycerol: 18 parts; sorbitol: 4 parts; ESBO: 8 parts; HTPB: 1 part; EPB: 0.5 part; maleic anhydride: 1.2 parts; citric acid: 0.8 part; GMA: 1.0 part | PVAc: 1 part; oleamide: 3 parts; barium sulfate: 3 parts; montmorillonite: 3 parts; epoxy chain extender: 1.2 parts | PBSA (45% of succinic acid, 15% of adipic acid, 40% of butylene glycol): 16 parts |
| Example 4 | ESBO: 12.6 parts; HTPB: 1 part; EPB: 0.5 part; maleic anhydride: 0.8 part; citric acid: 0.5 part; GMA: 0.8 part | PVAc: 7.5 parts; EEA: 2.5 parts; calcium stearate: 3 parts; mica powder: 6 parts; oxazoline chain extender: 1.2 parts | PBSA (30% of succinic acid, 30% of adipic acid, 40% of butylene glycol): 16 parts |
| Example 5 | sorbitol: 12.6 parts; HTPB: 1 part; EPB: 0.5 part; maleic anhydride: 0.8 part; GMA: 1.3 part | PVAc: 4 parts; EEA: 2 parts; calcium stearate: 3 parts; talc powder: 4 parts; montmorillonite: 2 parts; isocyanate drain extender: 0.8 part; oxazoline chain extender: 0.6 part; epoxy chain extender: 0.6 part | PBAT: 9 parts; PBSA (35% of succinic acid, 18% of adipic acid, 47% of butylene glycol): 16 parts |
| Example 6 | glycerol: 13 parts; ESBO: 12.6 parts; HTPB: 1 part; EPB: 0.5 part; citric acid: 1.3 parts; GMA: 0.8 part | PVAc: 3 parts; EEA: 3 parts; calcium stearate: 3 parts; talc powder: 3 parts; calcium carbonate: 3 parts; isocyanate drain extender: 1.2 parts | PBAT: 9 parts; PBSA (35% of succinic acid, 18% of adipic acid, 47% of butylene glycol): 10 parts |
| Example 7 | glycerol: 13 parts; sorbitol: 2.6 parts; HTPB: 1 part; EPB: 0.5 part; maleic anhydride: 0.8 part; citric acid: 0.5 part; GMA: 0.8 part | PVAc: 4 parts; EEA: 2 parts; calcium stearate: 3 parts; talc powder: 3 parts; calcium carbonate: 3 parts; epoxy chain extender: 1.2 parts | PBSA (35% of succinic acid, 18% of adipic acid, 47% of butylene glycol): 5 parts |
| Example 8 | glycerol: 13 parts; sorbitol: 2.6 parts; HTPB: 1 part; EPB: 0.5 part; maleic anhydride: 0.8 part; citric acid: 0.5 part; GMA: 0.8 part | PVAc: 4 parts; EEA: 2 parts; calcium stearate: 3 parts; barium sulfate: 6 parts; isocyanate chain extender: 1.2 parts | PBAT: 16 parts |

TABLE 2

Process parameters for Examples 1 to 8

| | Step (1) | | Step (2) | | | Step (3) | | | Step (4) | | | Step (5) | | Step (6) | |
|---|---|---|---|---|---|---|---|---|---|---|---|---|---|---|---|
| Example | Rotational speed (rpm) | Time (min) | Temperature (° C.) | Rotational speed (rpm) | Time (min) | Temperature (° C.) | Rotational speed (rpm) | Time (min) | Temperature (° C.) | Rotational speed (rpm) | Time (min) | Time (min) | Aspect ratio | Temperature (° C.) | Screw speed (rpm) |
| 1 | 900 | 4 | 60 | 1200 | 15 | 85 | 1000 | 12 | 85 | 1000 | 3 | 300 | 52:1 | 130 | 400 |
| 2 | 600 | 1 | 50 | 800 | 5 | 75 | 800 | 5 | 75 | 800 | 1 | 120 | 44:1 | 110 | 150 |
| 3 | 1000 | 5 | 70 | 1000 | 20 | 95 | 1200 | 15 | 95 | 1200 | 5 | 720 | 60:1 | 160 | 600 |
| 4 | 900 | 4 | 60 | 1200 | 15 | 85 | 1000 | 12 | 85 | 1000 | 3 | 300 | 52:1 | 130 | 400 |
| 5 | 900 | 4 | 60 | 1200 | 15 | 85 | 1000 | 12 | 85 | 1000 | 3 | 300 | 52:1 | 130 | 400 |
| 6 | 900 | 4 | 60 | 1200 | 15 | 85 | 1000 | 12 | 85 | 1000 | 3 | 300 | 52:1 | 130 | 400 |
| 7 | 900 | 4 | 60 | 1200 | 15 | 85 | 1000 | 12 | 85 | 1000 | 3 | 300 | 52:1 | 130 | 400 |
| 8 | 900 | 4 | 60 | 1200 | 15 | 85 | 1000 | 12 | 85 | 1000 | 3 | 300 | 52:1 | 130 | 400 |

Note 1:
The temperature in Table 2 is shown in ° C., the rotational speed is shown in rpm, and the time is shown in min.

Examples 9 to 16

The TPS masterbatch samples obtained in Examples 1 to 8 were used separately to prepare starch-based biodegradable films. The preparation process was as follows: 60 parts of TPS masterbatch were blended with 25 parts of PBSA and 20 parts of PBAT, and then blow molding was conducted at 165° C. with a blow-up ratio (BUR) of 4:1 to obtain a starch-based biodegradable film. The PBSA used here had the same ingredients as the PBSA added to the TPS masterbatch.

The prepared starch-based biodegradable films were tested. The test results are shown in Table 3. Test method: GB/T1040.3-2006.

TABLE 3

Test results for Examples 9 to 16

| | Thickness (mm) | Tensile strength (MPa) | Elongation at break (%) | Light transmittance (%) |
|---|---|---|---|---|
| Example 9 | 0.026 | 35 | 711 | 64 |
| Example 10 | 0.026 | 23 | 390 | 49 |
| Example 11 | 0.026 | 36 | 632 | 63 |
| Example 12 | 0.025 | 24 | 482 | 57 |
| Example 13 | 0.024 | 26 | 461 | 53 |

TABLE 3-continued

Test results for Examples 9 to 16

| | Thickness (mm) | Tensile strength (MPa) | Elongation at break (%) | Light transmittance (%) |
|---|---|---|---|---|
| Example 14 | 0.027 | 27 | 507 | 56 |
| Example 15 | 0.026 | 32 | 644 | 59 |
| Example 16 | 0.025 | 33 | 637 | 67 |

Starch Experimental Groups: Examples 17 to 22

A method for preparing a TPS masterbatch includes the following steps:

(1) 100 parts of starch and a part of modified starch were taken and adjusted to have a moisture content of 15% to 30%, and then subjected to a first high-speed stirring at room temperature for 4 min, with a rotational speed of 900 rpm;

(2) a resulting mixture was heated to 60° C., then added with 13 parts of glycerol, 2.6 parts of sorbitol, 1 part of HTPB, 1 part of EPB, 0.8 part of maleic anhydride, 0.5 part of citric acid and 0.8 part of GMA, and subjected to a second high-speed stirring at 1,200 rpm for 15 min;

(3) a resulting mixture was heated to 85° C., then added with 4 parts of PVAc, 2 parts of EEA, 3 parts of calcium stearate, 3 parts of talc powder, 3 parts of calcium carbonate and 1.2 parts of isocyanate chain extender, and subjected to a third high-speed stirring at 1,000 rpm for 12 min;

(4) at 85° C., 16 parts of PBSA (35% of succinic acid, 18% of adipic acid and 47% of butylene glycol) were added, and a resulting mixture was subjected to a fourth high-speed stirring at 1,000 rpm for 3 min;

(5) the stirring was stopped, and incubation lasted for 300 min; and (6) the incubated starch was subjected to melt extrusion to obtain a TPS masterbatch, where, the melt extrusion was conducted with an aspect ratio of 52:1, a temperature of 130° C., and a screw speed of 400 rpm, and the twin-screw extruder had a vacuum exhaust function module on the end thereof.

The ingredient lists are shown in Table 4, in parts by weight, and the process parameters for each step are shown in Table 2.

Corn starch was adopted in this example.

TABLE 4

Ingredient lists for Examples 17 to 22

| | Starch |
|---|---|
| Example 17 | Commercial starch with a moisture content of 15%: 100 parts |
| Example 18 | Commercial starch with a moisture content of 22%: 100 parts |
| Example 19 | Commercial starch with a moisture content of 30%: 100 parts |
| Example 20 | Commercial starch with a moisture content of 22%: 100 parts; oxidized starch: 1 part |
| Example 21 | Commercial starch with a moisture content of 22%: 100 parts; oxidized starch: 3 part; hydroxypropyl starch: 4 parts |
| Example 22 | Commercial starch with a moisture content of 22%: 100 parts; oxidized starch: 10 parts |

Examples 23 to 28

The TPS masterbatch samples obtained in Examples 17 to 22 were used separately to prepare starch-based biodegradable films. The preparation process was as follows: 60 parts of TPS masterbatch were blended with 25 parts of PBSA and 20 parts of PBAT, and then blow molding was conducted at 165° C. with a BUR of 4:1 to obtain a starch-based biodegradable film. The PBSA used in this example had the same ingredients as the PBSA added to the TPS masterbatch.

The prepared starch-based biodegradable films were tested. The test results are shown in Table 5. Test method: GB/T1040.3-2006.

TABLE 5

Test results for Examples 23 to 28

| | Thickness (mm) | Tensile strength (MPa) | Elongation at break (%) | Light transmittance (%) |
|---|---|---|---|---|
| Example 23 | 0.028 | 25 | 437 | 42 |
| Example 24 | 0.026 | 24 | 461 | 47 |
| Example 25 | 0.025 | 22 | 422 | 43 |
| Example 26 | 0.027 | 27 | 493 | 51 |
| Example 27 | 0.026 | 35 | 711 | 64 |
| Example 28 | 0.026 | 28 | 502 | 55 |

It can be seen that the addition of modified starch can further increase the tensile strength and elongation of a starch-based biodegradable film.

PB Experimental Groups: Examples 29 to 34 and Comparative Example 1

A method for preparing a TPS masterbatch includes the following steps:

(1) 100 parts of starch were taken and adjusted to have a moisture content of 22%, 3 parts of oxidized starch and 4 parts of hydroxypropyl starch were added, and a resulting mixture was subjected to a first high-speed stirring at room temperature;

(2) a resulting mixture was heated, added with a part of additives, and then subjected to a second high-speed stirring;

(3) a resulting mixture was heated, added with 4 parts of PVAc, 2 parts of EEA, 3 parts of calcium stearate, 3 parts of talc powder, 3 parts of calcium carbonate and 1.2 parts of isocyanate chain extender, and then subjected to a third high-speed stirring;

(4) 16 parts of PBSA (35% of succinic acid, 18% of adipic acid and 47% of butylene glycol) were added, and a resulting mixture was subjected to a fourth high-speed stirring;

(5) the stirring was stopped, and incubation was conducted; and (6) the incubated starch was subjected to melt extrusion to obtain a TPS masterbatch.

The ingredient lists are shown in Table 6, in parts by weight, and the process parameters for each step refer to Example 17.

Corn starch was adopted in this example.

TABLE 6

Ingredient lists for Examples 29 to 34 and Comparative Example 1

Additives added the first time

| | |
|---|---|
| Example 29 | Glycerol: 13 parts; sorbitol: 2.6 parts; HTPB: 2 parts; EPB: 1 part; maleic anhydride: 0.8 part; citric acid: 0.5 part; GMA: 0.8 part |
| Example 30 | Glycerol: 13 parts; sorbitol: 2.6 parts; HTPB: 0.6 part; EPB: 0.6 part; 1,2-polybutadiene homopolymer: 0.8 part; maleic anhydride: 0.8 part; citric acid: 0.5 part; GMA: 0.8 part |
| Example 31 | Glycerol: 13 parts; sorbitol: 2.6 parts; HTPB: 1 part; EPB: 1 part; maleic anhydride: 0.8 part; citric acid: 0.5 part; GMA: 0.8 part |
| Example 32 | Glycerol: 13 parts; sorbitol: 2.6 parts; HTPB: 1 part; EPB: 0.5 part; maleic anhydride: 0.8 part; citric acid: 0.5 part; GMA: 0.8 part |
| Example 33 | Glycerol: 13 parts; sorbitol: 2.6 parts; HTPB: 1.5 parts; EPB: 0.5 part; maleic anhydride: 0.8 part; citric acid: 0.5 part; GMA: 0.8 part |
| Example 34 | Glycerol: 13 parts; sorbitol: 2.6 parts; HTPB: 0.1 part; maleic anhydride: 0.8 part; citric acid: 0.5 part; GMA: 0.8 part |
| Comparative Example 1 | Glycerol: 13 parts; sorbitol: 2.6 parts; maleic anhydride: 0.8 part; citric acid: 0.5 part; GMA: 0.8 part |

Examples 35 to 40 and Comparative Example 2

The TPS masterbatch samples obtained in Examples 29 to 34 were used separately to prepare starch-based biodegradable films. The preparation process was as follows: 60 parts of TPS masterbatch were blended with 25 parts of PBSA and 20 parts of PBAT, and then blow molding was conducted at 165° C. with BUR of 4:1 to obtain a starch-based biodegradable film. The PBSA used here had the same ingredients as the PBSA added to the TPS masterbatch.

The TPS masterbatch samples obtained in Comparative Example 1 were used separately to prepare starch-based biodegradable films. The preparation process was as follows: 60 parts of TPS masterbatch were blended with 25 parts of PBSA and 20 parts of PBAT, and then blow molding was conducted at 165° C. with BUR of 4:1 to obtain the starch-based biodegradable film of Comparative Example 2. The PBSA used here had the same ingredients as the PBSA added to the TPS masterbatch.

The prepared starch-based biodegradable films were tested. The test results are shown in Table 7. Test method: GB/T1040.3-2006.

TABLE 7

Test results for Examples 35 to 40 and Comparative Example 2

| | Thickness (mm) | Tensile strength (MPa) | Elongation at break (%) | Light transmittance (%) |
|---|---|---|---|---|
| Example 35 | 0.027 | 31 | 629 | 57 |
| Example 36 | 0.027 | 33 | 640 | 60 |
| Example 37 | 0.026 | 35 | 711 | 64 |
| Example 38 | 0.026 | 35 | 670 | 63 |
| Example 39 | 0.027 | 34 | 689 | 63 |
| Example 40 | 0.027 | 29 | 493 | 55 |
| Comparative Example 2 | 0.027 | 26 | 450 | 51 |

It can be seen that the addition of a trace amount of PB can further improve the tensile strength and elongation of a starch-based biodegradable film.

Starch-based biodegradable film experimental groups: Examples 41 to 46

The TPS masterbatch of Example 1 was used to prepare starch-based biodegradable films. The PBSA used here had the same ingredients as the PBSA added to the TPS masterbatch. The ingredient lists and process parameters are shown in Table 8.

TABLE 8

Ingredient lists and process parameters for Examples 41 to 46

| | TPS masterbatch | Biodegradable resin | Blow molding temperature (° C.) | BUR |
|---|---|---|---|---|
| Example 41 | 60 parts | PLA: 10 parts; PBSA: 15 parts; PBAT: 10 parts; PPC: 15 parts | 145 | 3:1 |
| Example 42 | 40 parts | PBSA: 25 parts; PLA: 20 parts | 165 | 4:1 |
| Example 43 | 60 parts | PBSA: 40 parts | 155 | 3:1 |
| Example 44 | 60 parts | PBSA: 25 parts; PBAT: 20 parts | 165 | 4:1 |
| Example 45 | 70 parts | PBAT: 40 parts | 160 | 5:1 |
| Example 46 | 80 parts | PBSA: 25 parts; PBAT: 30 parts | 175 | 5.5:1 |

What is claimed is:
1. A multi-stage modified thermoplastic starch (TPS) masterbatch, prepared by the following raw materials, in parts by weight:
   a first starch with a moisture content of 15% to 30%: 100 parts
   a plasticizer: 10 to 30 parts
   polybutadiene (PB): 0.1 to 3 parts
   a chemical modifier: 0.5 to 3 parts a tackifier: 1 to 10 parts
a lubricant: 1 to 5 parts
a filler: 1 to 10 parts
a chain extender: 0.5 to 2 parts
a first biodegradable resin: 5 to 25 parts, wherein the first biodegradable resin is for masterbatch
a second starch that is a modified starch: 1 to 10 parts;
wherein, the starch is subjected to a four-stage modification treatment; and the four-stage modification treatment is specifically as follows: 100 parts of the starch with the moisture content of 15% to 30% and the modified starch are added to a high-speed mixer to obtain a mixed starch and a first stirring is performed on the mixed starch at a first predetermined speed under room temperature; the mixed starch is heated to a first temperature of 50° C. to 70° C., and the PB, the plasticizer, and the chemical modifier are added to the mixed starch to obtain a first resulting mixture, and a second stirring is performed on the first resulting mixture at a second predetermined speed; the first resulting mixture is heated to a second temperature of 75° C. to 95° C., and the tackifier, the lubricant, the filler, and the chain extender are added to the first resulting mixture to obtain a second resulting mixture, and a third stirring is performed on the second resulting mixture at a third predetermined speed; the first biodegradable resin is added to the second resulting mixture at the second temperature to obtain a third resulting mixture, and a fourth stirring is performed on the third resulting mixture at a fourth predetermined speed; and after the fourth stirring is stopped, an incubation is performed on the third resulting mixture at the second temperature for a period of time to obtain an incubated mixture, and then the incubated mixture is added to a twin-screw extruder for a melt extrusion to obtain the multi-stage modified thermoplastic starch (TPS) masterbatch;
wherein, the modified starch is at least one selected from the group consisting of oxidized starch and hydroxypropyl starch;
wherein, the first biodegradable resin for masterbatch is at least one selected from the group consisting of PBAT and PBSA;
wherein, the PB is at least one selected from the group consisting of hydroxyl-terminated polybutadiene (HTPB), epoxidized polybutadiene (EPB), and 1,2-polybutadiene homopolymer;
wherein, the chemical modifier is at least one selected from the group consisting of maleic anhydride, citric acid, and glycidyl methacrylate (GMA).

2. The multi-stage modified TPS masterbatch according to claim 1, wherein, the plasticizer is at least one selected from the group consisting of glycerol, sorbitol, and epoxy soybean oil (ESBO); the tackifier is at least one selected from the group consisting of polyvinyl acetate (PVAc) and ethylene-ethyl acrylate copolymer (EEA); the lubricant is at least one selected from the group consisting of calcium stearate, oleamide, and erucamide; the filler is at least one selected from the group consisting of talc powder, calcium carbonate, barium sulfate, montmorillonite, and mica powder; and the chain extender is at least one selected from the group consisting of an isocyanate chain extender, an epoxy chain extender, and an oxazoline chain extender.

3. The multi-stage modified TPS masterbatch according to claim 2, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to12 h.

4. The multi-stage modified TPS masterbatch according to claim 2, wherein, the PB is a mixture of the HTPB and the EPB, and the HTPB and the EPB are mixed at a weight ratio of 3:1 to 1:1.

5. The multi-stage modified TPS masterbatch according to claim 4, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to12 h.

6. The multi-stage modified TPS masterbatch according to claim 2, wherein, the tackifier is a copolymer of the PVAc and the EEA, and the PVAc and the EEA are mixed at a weight ratio of 3:1 to 1:1.

7. The multi-stage modified TPS masterbatch according to claim 6, wherein the first biodegradable resin for masterbatch consists of PBSA or PBSA and PBAT, wherein in the PBSA, succinic acid has a copolymerization percent of 30% to 45%, adipic acid has a copolymerization percent of 15% to 30%, and butylene glycol has a copolymerization percent of 40% to 55%.

8. The multi-stage modified TPS masterbatch according to claim 7, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to12 h.

9. The multi-stage modified TPS masterbatch according to claim 6, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to12 h.

10. The multi-stage modified TPS masterbatch according to claim 1, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to12 h.

11. A method for preparing the multi-stage modified TPS masterbatch according to claim 1, comprising:
(1) subjecting 100 parts of the starch with the moisture content of 15% to 30% and the modified starch to the first stirring at room temperature to obtain the mixed starch;

(2) heating the mixed starch to the first temperature of 50° C. to 70° C., then adding the plasticizer, the PB, and the chemical modifier to the mixed starch to obtain the first resulting mixture, and subjecting the first resulting mixture to the second stirring;

(3) heating the first resulting mixture to the second temperature of 75° C. to 95° C., then adding the tackifier, the lubricant, the filler, and the chain extender to the first resulting mixture to obtain the second resulting mixture, and subjecting the second resulting mixture to the third stirring;

(4) adding the first biodegradable resin to the second resulting mixture to obtain the third resulting mixture, and subjecting the third resulting mixture to the fourth stirring;

(5) stopping the fourth stirring, and conducting the incubation on the third resulting mixture to obtain the incubated mixture; and (6) adding the incubated mixture to the twin-screw extruder to obtain the multi-stage modified TPS masterbatch through extruding, air cooling and granulating.

12. The method for preparing the multi-stage modified TPS masterbatch according to claim 11, wherein, the first stirring is conducted at the first predetermined speed of 600 rpm to 1,000 rpm for 1 min to 5 min; the second stirring is conducted at the second predetermined speed of 800 rpm to 1,200 rpm for 5 min to 20 min; the third stirring is conducted at the third predetermined speed of 800 rpm to 1,200 rpm for 5 min to 15 min; the fourth stirring is conducted at the fourth predetermined speed of 800 rpm to 1,200 rpm for 1 min to 5 min; and the incubation lasts for the period of time of 2 h to 12 h.

13. The method for preparing the multi-stage modified TPS masterbatch according to claim 10, wherein, in step (6), the twin-screw extruder is adopted for the melt extrusion; the melt extrusion is conducted with an aspect ratio of 44:1 to 60:1, a temperature of 110° C. to 160° C., and a screw speed of 150 rpm to 600 rpm; and the twin-screw extruder has a vacuum exhaust function module on an end of the twin-screw extruder.

14. The method for preparing the multi-stage modified TPS masterbatch according to claim 11, wherein, the plasticizer is at least one selected from the group consisting of glycerol, sorbitol, and epoxy soybean oil (ESBO); the tackifier is at least one selected from the group consisting of polyvinyl acetate (PVAc) and ethylene-ethyl acrylate copolymer (EEA); the lubricant is at least one selected from the group consisting of calcium stearate, oleamide, and erucamide; the filler is at least one selected from the group consisting of talc powder, calcium carbonate, barium sulfate, montmorillonite, and mica powder; and the chain extender is at least one selected from the group consisting of an isocyanate chain extender, an epoxy chain extender, and an oxazoline chain extender.

15. The method for preparing the multi-stage modified TPS masterbatch according to claim 14, wherein, the PB is a mixture of the HTPB and the EPB, and the HTPB and the EPB are mixed at a weight ratio of 3:1 to 1:1.

16. A starch-based biodegradable film, prepared by the following raw materials, in parts by weight:
the multi-stage modified TPS masterbatch according to claims 1: 40 to 80 parts, and
a second biodegradable resin: 40 to 55 parts.

17. The starch-based biodegradable film according to claim 16, wherein the second biodegradable resin is at least one selected from the group consisting of PLA, PBSA, PBAT, and PPC.

18. A method for preparing the starch-based biodegradable film according to claim 16, comprising the following steps: blending the multi-stage modified TPS masterbatch with the second biodegradable resin, and conducting a blow molding to produce the starch-based biodegradable film.

19. The method for preparing the starch-based biodegradable film according to claim 18, wherein the blown molding is conducted at 145° C. to 175° C., and a blow-up ratio (BUR) of the blow molding is 3:1 to 5.5:1.

20. A process for the use of the multi-stage modified TPS masterbatch according to claim 1 comprising preparing a starch-based biodegradable film with the multi-stage modified TPS masterbatch of claim 1.

* * * * *